United States Patent
Iguchi

(10) Patent No.: US 7,343,183 B2
(45) Date of Patent: Mar. 11, 2008

(54) PORTABLE WIRELESS UNIT

(75) Inventor: Akihiko Iguchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 200 days.

(21) Appl. No.: 10/551,800

(22) PCT Filed: Mar. 28, 2005

(86) PCT No.: PCT/JP2005/005692

§ 371 (c)(1),
(2), (4) Date: Sep. 30, 2005

(87) PCT Pub. No.: WO2005/096437

PCT Pub. Date: Oct. 13, 2005

(65) Prior Publication Data

US 2006/0183515 A1 Aug. 17, 2006

(30) Foreign Application Priority Data

Apr. 2, 2004 (JP) ............................. 2004-109784

(51) Int. Cl.
*H04M 1/00* (2006.01)
(52) U.S. Cl. ................. 455/575.7; 343/702; 455/575.3
(58) Field of Classification Search ............ 455/575.1, 455/575.5, 575.7, 575.3; 343/700, 702
See application file for complete search history.

(56) References Cited

U.S. PATENT DOCUMENTS

| | | | | |
|---|---|---|---|---|
| 5,923,305 | A * | 7/1999 | Sadler et al. ................ | 343/895 |
| 6,246,374 | B1 * | 6/2001 | Perrotta et al. ............. | 343/702 |
| 6,249,688 | B1 * | 6/2001 | Holshouser et al. ..... | 455/575.7 |
| 6,563,467 | B1 * | 5/2003 | Buris et al. ................. | 343/702 |
| 6,697,023 | B1 * | 2/2004 | Tiao-Hsing et al. ........ | 343/702 |
| 6,856,819 | B2 * | 2/2005 | Itoh ........................ | 455/575.7 |
| 7,126,545 | B2 * | 10/2006 | Nagano et al. ............. | 343/702 |
| 7,162,264 | B2 * | 1/2007 | Vance ..................... | 455/550.1 |
| 2001/0029173 | A1 * | 10/2001 | Ogino ..................... | 455/279.1 |
| 2001/0036845 | A1 | 11/2001 | Park | |
| 2003/0045324 | A1 * | 3/2003 | Nagumo et al. ............ | 455/550 |
| 2004/0021608 | A1 | 2/2004 | Kojima et al. | |
| 2004/0219956 | A1 * | 11/2004 | Iwai et al. ................ | 455/575.3 |

(Continued)

FOREIGN PATENT DOCUMENTS

JP 10-84406 3/1998

(Continued)

OTHER PUBLICATIONS

International Search Report corresponding to International Application No. PCT/JP2005/005692, dated Mar. 28, 2005.

(Continued)

*Primary Examiner*—Edward F. Urban
*Assistant Examiner*—Christian A. Hannon
(74) *Attorney, Agent, or Firm*—RatnerPrestia

(57) ABSTRACT

A portable wireless apparatus having a first parasitic element disposed in the front case of a first casing and made longer than the electrical length of an antenna, and a second parasitic element disposed in the back case of the first casing and made shorter than the electrical length of the antenna. The portable wireless apparatus has a radiation directivity on the opposite side of a human body so that it reduces a characteristic degradation in speeches.

8 Claims, 7 Drawing Sheets

U.S. PATENT DOCUMENTS

2005/0024273 A1* 2/2005 Hayes .................. 343/702

FOREIGN PATENT DOCUMENTS

| JP | 10-084406 | 3/1998 |
| JP | 11-136015 | 5/1999 |
| JP | 2001/077611 | 3/2001 |
| JP | 2001-77611 | 3/2001 |
| JP | 2003-008320 | 1/2003 |
| JP | 2003-110329 | 4/2003 |
| JP | 2003/110329 | 4/2003 |
| JP | 2003-204281 | 7/2003 |

OTHER PUBLICATIONS

English translation of Search Report Form PCT/ISA/210.
European Search Report corresponding to International Application No. PCT/JP2005/005692, dated Feb. 17, 2006.

* cited by examiner

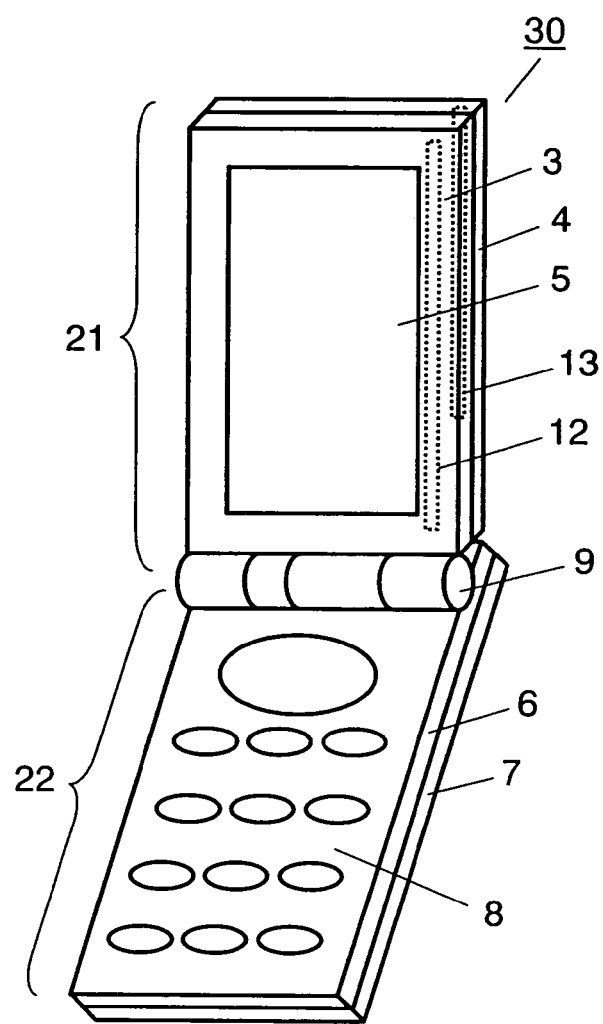
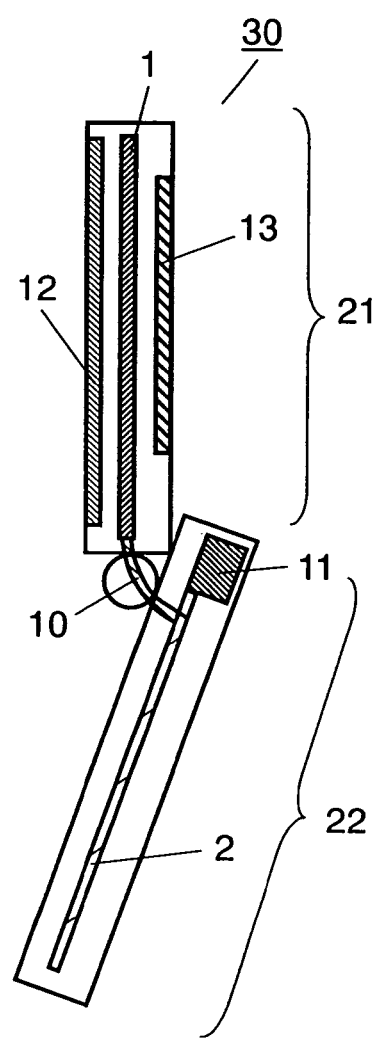
FIG. 1A
FIG. 1B

← To side of human body    To side opposite to human body →

← To side of human body    To side opposite to human body →

FIG. 6A
FIG. 6B
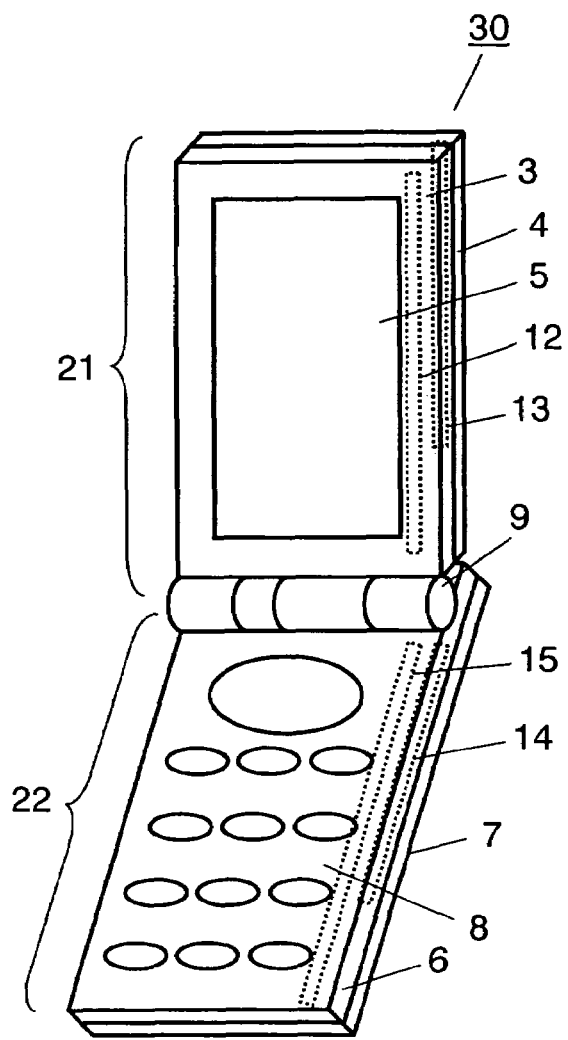
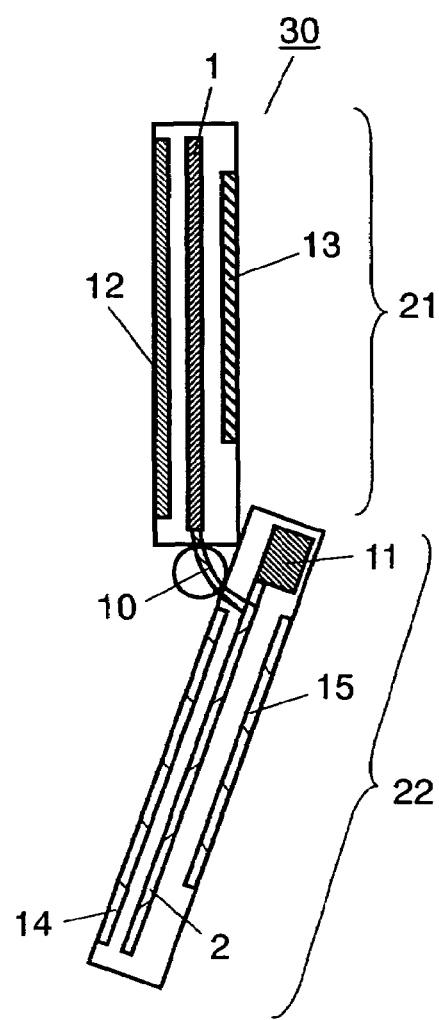

PORTABLE WIRELESS UNIT

This application is a U.S. National Phase application of PCT/JP2005/005692 dated Mar. 28, 2005.

TECHNICAL FIELD

The present invention relates to a portable wireless apparatus such as a mobile phone or a PHS.

BACKGROUND ART

The portable wireless apparatus such as the mobile phone has advanced the size reduction of a terminal. The portable wireless apparatus having an antenna packaged in its casing has been increasing in number.

FIG. 7A presents a perspective view of an openable portable wireless apparatus of the prior art, and FIG. 7B presents a sectional view of the portable wireless apparatus of FIG. 7A.

In FIG. 7A and FIG. 7B, first casing 121 having main display 105 on its surface is covered with front case 103 of first casing 121 and back case 104 of first casing 121 and is equipped therein with first circuit board 101. Moreover, second casing 122 input unit 108 on its surface is covered with front case 106 of second casing 122 and back case 107 of second casing 122 and is equipped therein with second circuit board 102. Circuit board connector 110 is housed in hinge 109 for connecting the two casings in a foldable manner, and connects first circuit board 101 and second circuit board 102.

In the case of the openable portable wireless apparatus, as shown in FIG. 7A and FIG. 7B, an antenna 111 is frequently configured in the vicinity of hinge 119 or in the end portion of the casing.

This portable wireless apparatus of the prior art is disclosed in JP-A-2003-8320, for example.

In case, however, antenna 111 is configured in hinge 109 of the portable wireless apparatus of the prior art thus far described, it comes closer to the human body in speeches. Therefore, the portable wireless apparatus is troubled by a problem that its communication performances are degraded as the telephone by the electric power absorption of the human body.

DISCLOSURE OF THE INVENTION

A portable wireless apparatus comprises: a first casing including a front case on the side having a main display, a back case on the opposite side of the front case, and a first circuit board; a second casing including a front case on the side having an input unit, a back case on the opposite side of the front case, and a second circuit board; a circuit board connector for electrically connecting the first circuit board and the second circuit board; a hinge having the circuit board connector for connecting the first casing and the second casing in a foldable manner; an antenna connected to the hinge side of the second circuit board; a first parasitic element configured in the front case and made longer than the electrical length of the antenna; and a second parasitic element configured in the back case and made shorter than the electrical length of the antenna.

BRIEF DESCRIPTION OF THE DRAWINGS

FIG. 1A is a perspective view of a portable wireless apparatus according to one embodiment of the invention.

FIG. 1B is a sectional view of the portable wireless apparatus of FIG. 1A.

FIG. 6A is a perspective view of a portable wireless apparatus according to one embodiment of the invention.

FIG. 6B is a sectional view of the portable wireless apparatus of FIG. 6A.

DESCRIPTION OF REFERENCE NUMERALS AND SIGNS

Figure 2A:
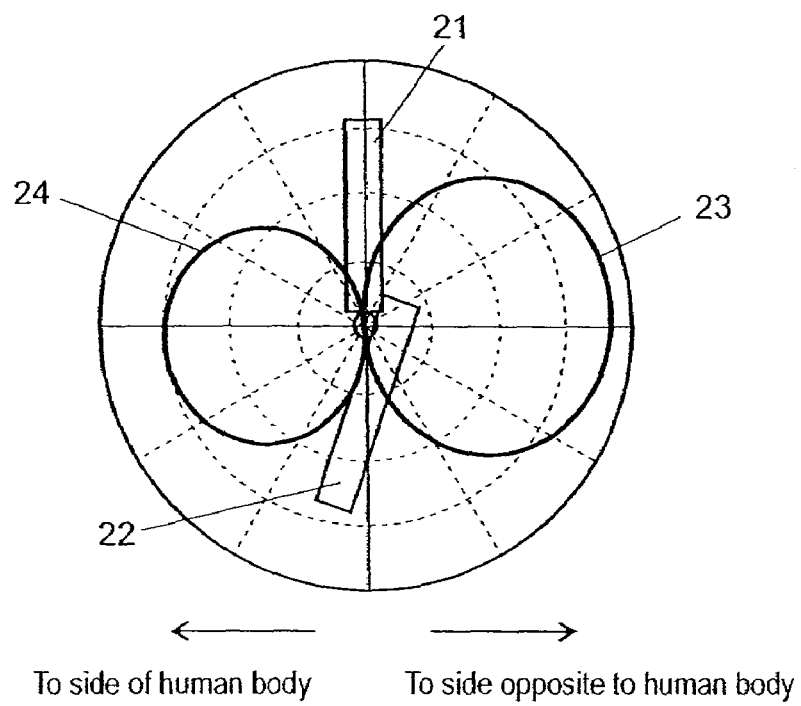
FIG. 2A is a radiation pattern of the portable wireless apparatus according to the embodiment of the invention.

| | |
|---|---|
| 1 | First circuit board |
| 2 | Second circuit board |
| 3 | Front case of first casing |
| 4 | Back case of first casing |
| 5 | Main display |
| 6 | Front case of second casing |
| 7 | Back case of second casing |
| 8 | Input unit |
| 9 | Hinge |
| 10 | Circuit board connector |
| 11 | Antenna |
| 12 | First parasitic element |
| 13 | Second parasitic element |
| 14 | Third parasitic element |
| 15 | Fourth parasitic element |
| 16 | First connector |
| 17 | Second connector |
| 18 | First short-circuiting portion |
| 19 | Second short-circuiting portion |
| 21 | First casing |
| 22 | Second casing |

DETAILED DESCRIPTION OF THE PREFERRED EMBODIMENTS

The invention contemplates to solve the problems of the portable wireless apparatus of the prior art thus far described, and has an object to provide a portable wireless apparatus having a configuration for reducing the degradation in communication performances in speeches.

Embodiment 1

The invention will be described on Embodiment 1 with reference to the accompanying drawings.

FIG. 1A is a perspective view showing a portable wireless apparatus according to Embodiment 1 of the invention, and FIG. 1B is a sectional view of the portable wireless apparatus according to Embodiment 1 of the invention.

In FIG. 1A and FIG. 1B, first casing 21 having main display 5 on its surface is equipped with front case 3 and back case 4 and therein with first circuit board 1. Second casing 22 having input unit 8 on its surface is equipped with surface case 6 and back case 7 and therein with second circuit board 2. Circuit board connector 10 is housed in hinge 9 for connecting first case 21 and second case 22 in an openable manner. First circuit board 1 and second circuit board 2 are connected by circuit board connector 10. Antenna 11 is connected with second circuit board 2 on the side of hinge 9. Main display 5 displays the letters, images and so on of communications, operations and accessory functions at portable wireless apparatus 30. First circuit board 1 and second circuit board 2 act to execute the communications, operations and accessory functions at portable wireless apparatus 30. Input unit 8 is used by the user so as to input the letters, symbols or instructions, when the user executes the communications, operations and accessory functions at portable wireless apparatus 30.

In front case 3 of first casing 21, there is configured first parasitic element 12, which has a longer electrical length than the frequency of antenna 11 and acts as a reflector. In back case 4 of first casing 21, on the other hand, there is configured second parasitic element 13 which has a shorter electrical length than the frequency of antenna 11 and which has the action as a director. First parasitic element 12 and second parasitic element 13 are packaged and configured in the end portions of the casing at positions pairing each other. The electrical length implies the effective length at the time when first parasitic element 12 and second parasitic element 13 act as antennas. With this configuration, a directive control for decreasing the radiation toward the human body in the speeches but directing the same in the opposite direction can be made to reduce the degradation of the communication characteristics in the speeches. Portable wireless apparatus 30 in Embodiment 1 of the invention is thus configured.

In FIG. 1A and FIG. 1B, first parasitic element 12 and second parasitic element 13 are disposed longitudinally of FIG. 1A. In the invention, it is needless to say that first parasitic element 12 and second parasitic element 13 may also be disposed transversely of FIG. 1A.

Figure 2B:
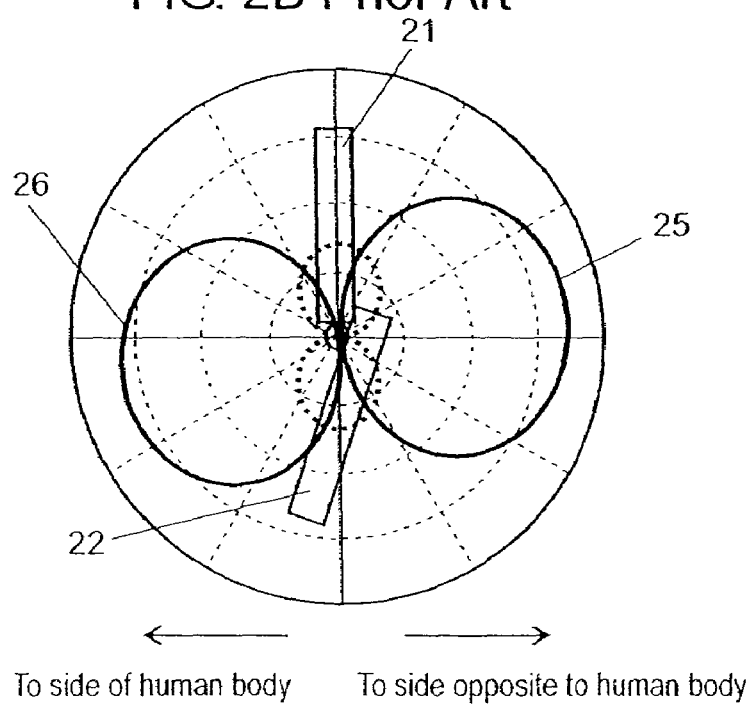
FIG. 2B is a radiation pattern of the portable wireless apparatus of the prior art.

With reference to FIG. 2A and FIG. 2B, here is described the comparison of the radiation patterns of the cases, in which the configuration of this embodiment is used and not. FIG. 2A shows radiation patterns of the case, in which the configuration of the embodiment is used, and FIG. 2B shows radiation patterns of the case, the configuration of the embodiment is not used, that is, the radiation patterns in the configuration of the prior art.

FIG. 2A shows the radiation patterns in the sectional directions of first casing 21 and second casing 22 of portable wireless apparatus 30. FIG. 2B shows the radiation patterns in the sectional directions of first casing 121 and second casing 122 of the portable wireless apparatus. In the ordinary using state of portable wireless apparatus 30, the upward direction of the faces of the two Figures are directed vertically upward, and the leftward direction of the faces of the two Figures is oriented toward the human body side whereas the rightward direction of the faces of the two Figures is oriented backward of the human body. In FIG. 2A, radiation pattern 24 is that of portable wireless apparatus 30 of this embodiment on the human body side, and radiation pattern 23 is that of portable wireless apparatus 30 of this embodiment on the opposite side of the human body. Radiation pattern 23 is larger than radiation pattern 24. In case portable wireless apparatus 30 of this embodiment is used, a stronger radiation occurs on the opposite side of the human body, and the radiation to occur on the body side is weaker. In FIG. 2B, on the other hand, radiation pattern 26 is that of portable wireless apparatus of the prior art on the human body side, and radiation pattern 25 is that of portable wireless apparatus of the prior art on the opposite side of the human body. Radiation pattern 25 and radiation pattern 26 are substantially identical. In other words, the radiation to occur on the human body side is not weak, in case the portable wireless apparatus of the prior art is used.

In this embodiment, first parasitic element 12 acts as the reflector so that it can suppress the radiation toward the human body, and second parasitic element 13 acts as the director so that it can establish the radiation directivity backward of the human body. As shown by radiation pattern 24 and radiation pattern 25 in FIG. 2A, therefore, it is possible to confirm that the radiation gain backward of the human body is high whereas the radiation gain toward the human body is low. The directivity can be more turned backward of the human body especially by setting first parasitic element 12 to a length larger than the half wavelength of a predetermined frequency band and second parasitic element 13 to a length smaller than the half wavelength of the predetermined frequency band. The predetermined frequency is used for the transmissions/receptions in portable wireless apparatus 30. Here, first parasitic element 12 and second parasitic element 13 are conductors having wavelengths generally shorter than those in an ideal space. This shortening extent is generally called the "shortening percentage". Therefore, it goes without saying that the wavelength or the unit for defining the aforementioned length of first parasitic element 12 or second parasitic element 13 contains the case, in which the shortening percentage is considered.

Moreover, the user grips second casing 22, but first parasitic element 12 and second parasitic element 13 are configured on the side of first casing 21 so that the characteristic influences on the parasitic elements can be reduced even with the gripping.

Moreover, first parasitic element 12 and second parasitic element 13 are so individually configured on the end portion of first casing 21 as to oppose each other. As a result, the influences from the remaining parts of the portable wireless apparatus can be reduced to give more directivity to the opposite side of the human body.

With this configuration of the invention, in the communicating state near the human body, it is possible to reduce such a degradation of the communication performances of the portable wireless apparatus as might otherwise be caused by the power absorption of the human body because the antenna unit approaches the human body.

Here, the means for realizing first parasitic element 12 and second parasitic element 13 is exemplified by plating front case 3 or back case 4 or by fixing a metal sheet on the same. Thus, it is possible to produce the portable wireless apparatus inexpensively.

By thus using first parasitic element 12 acting as the reflector and second parasitic element 13 acting as the director, it is possible to provide the portable wireless apparatus, which can have the radiation directivity backward of the human body so that it can reduce the degradation of the communication performances in the speech.

Figure 3:
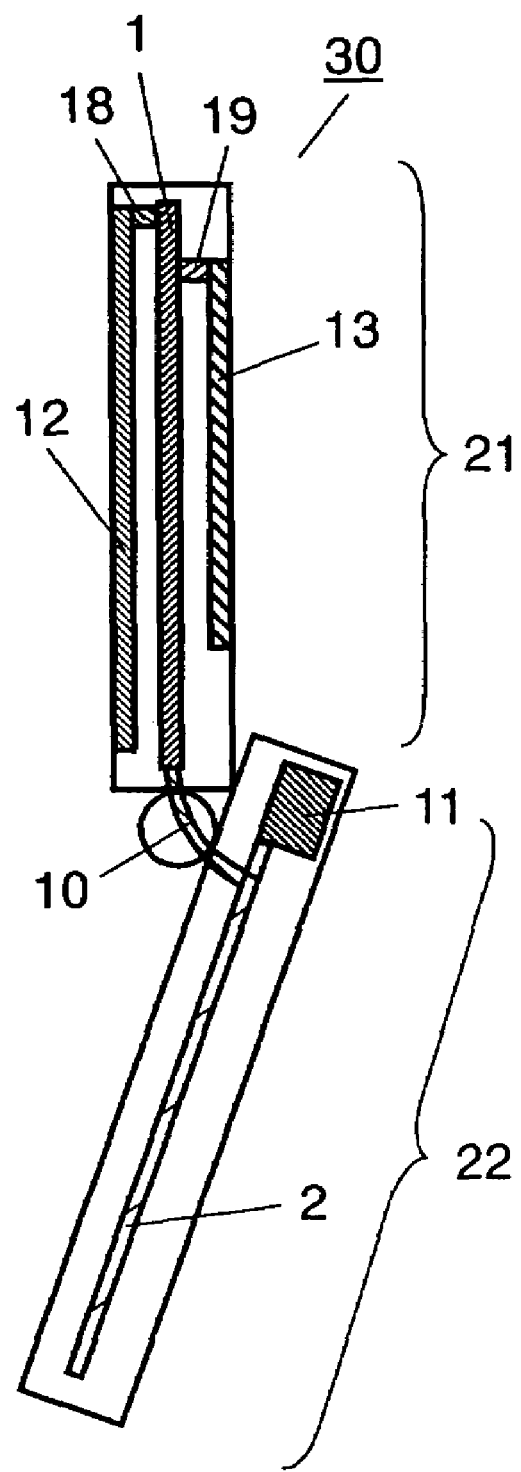
FIG. 3 is a sectional view of a portable wireless apparatus according to the embodiment of the invention.

The section of a portable wireless apparatus of another configuration of this embodiment is shown FIG. 3. In this configuration, portable wireless apparatus 30 is equipped with first short-circuiting portion 18 for connecting parasitic element 12 and first circuit board 1 and second short-circuiting portion 19 for connecting second parasitic element 13 and first circuit board 1.

By thus connecting first parasitic element 12 with first circuit board 1 through first short-circuiting portion 18, as in this configuration, first parasitic element 12 can be made longer than one quarter wavelength so that it can be shortened by the monopole action of the GND of the board to about one half as short as that of the case, in which short-circuiting portion 18 is not used. Likewise, by connecting second parasitic element 13 with first circuit board 1 through second short-circuiting portion 19, second parasitic element 13 can be made shorter than one quarter wavelength so that it can be shortened to about one half as short as that of the case, in which short-circuiting portion 19 is not used.

In the description thus far made, first parasitic element 12 is configured in front case 3 of first casing 21, and second parasitic element 13 is configured in back case 4 of first casing 21. However, the invention can achieve an effect to control the directivity although influenced by the gripping, even if first parasitic element 12 is arranged in front case 6 of second casing 22 and if second parasitic element 13 is arranged in back case 7 of second casing 22.

In the description thus far made, moreover, first casing 21 is configured of front case 3 and back case 4, and second casing 22 is configured of front case 6 and back case 7. In the invention, however, either of the front and back sides of each casing may be formed of a case whereas the other may be formed of a cover.

Embodiment 2

The invention will be described on Embodiment 2 with reference to the accompanying drawings.

Figure 4A:
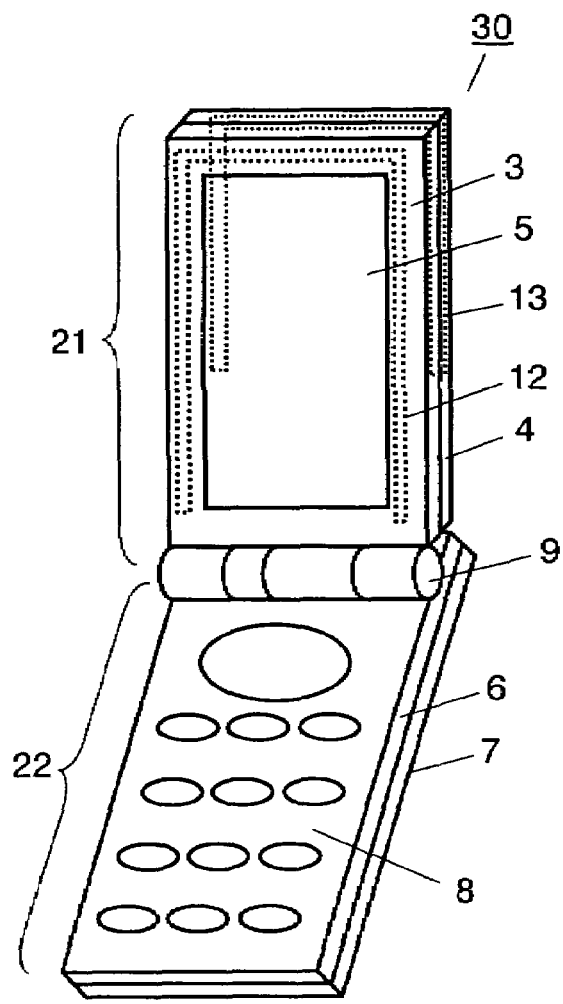
FIG. 4A is a perspective view of a portable wireless apparatus according to one embodiment of the invention.
Figure 4B:
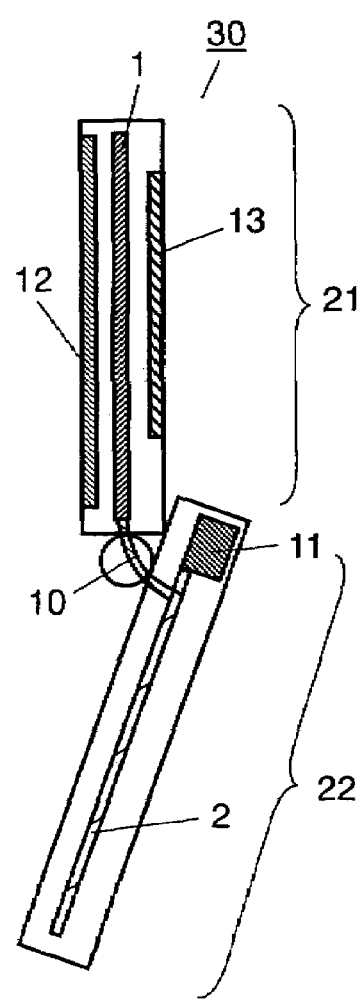
FIG. 4B is a sectional view of the portable wireless apparatus of FIG. 4A.

FIG. 4A is a perspective view showing a portable wireless apparatus according to Embodiment 2 of the invention, and FIG. 4B is a sectional view of the portable wireless apparatus according to Embodiment 2. Here, the description on the components having configurations similar to those of Embodiment 1 is omitted by designating them by the common reference numerals.

The difference between Embodiment 2 and foregoing Embodiment 1 resides in that at least one of first parasitic element 12 and second parasitic element 13 is configured generally into a shape of letter substantially "U" along the casing shape.

This configuration makes it possible to enlarge the lengths of first parasitic element 12 and second parasitic element 13 while suppressing the influences of first circuit board 1 and second circuit board 2 and the parts packaged in those boards. Therefore, the configuration can match such a low frequency as needs a large element length.

In FIG. 4A and FIG. 4B, first parasitic element 12 and second parasitic element 13 are configured on the side of first casing 21. However, the effect to control the directivity although influenced by the gripping can be obtained, even if first parasitic element 12 and second parasitic element 13 are configured on the side of second casing 22.

In Embodiment 2, moreover, the side failing to form the C-shape may be located at any one.

Embodiment 3

The invention will be described on Embodiment 3 with reference to the accompanying drawings.

Figure 5A:
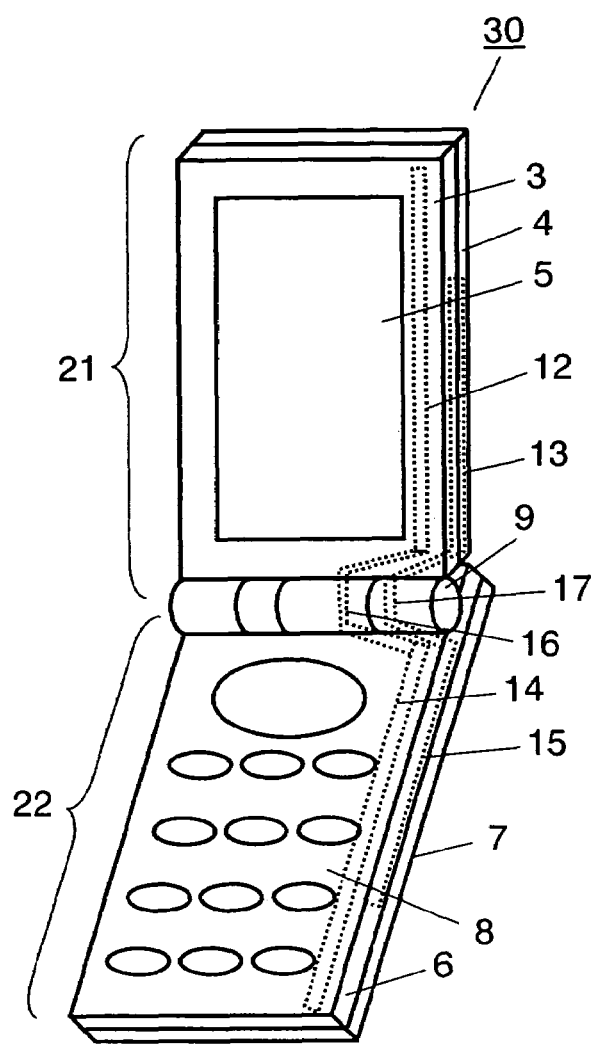
FIG. 5A is a perspective view of a portable wireless apparatus according to one embodiment of the invention.
Figure 5B:
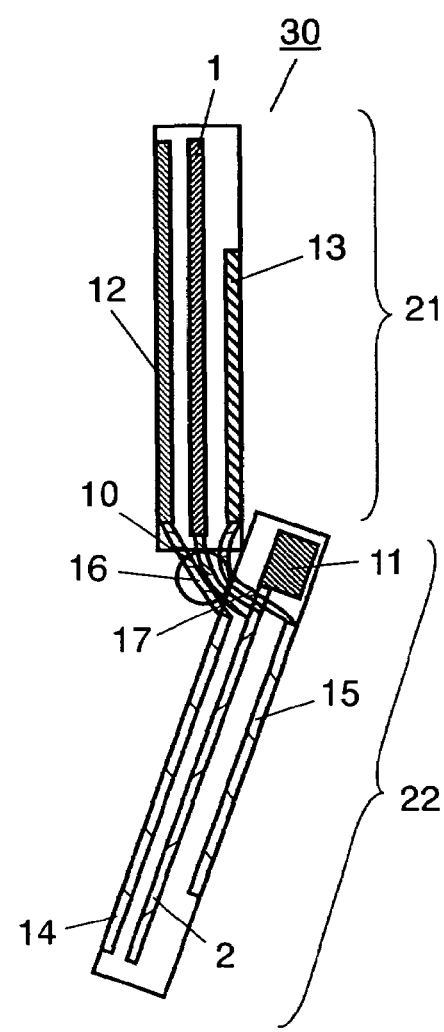
FIG. 5B is a sectional view of the portable wireless apparatus of FIG. 5A.
Figure 7A:
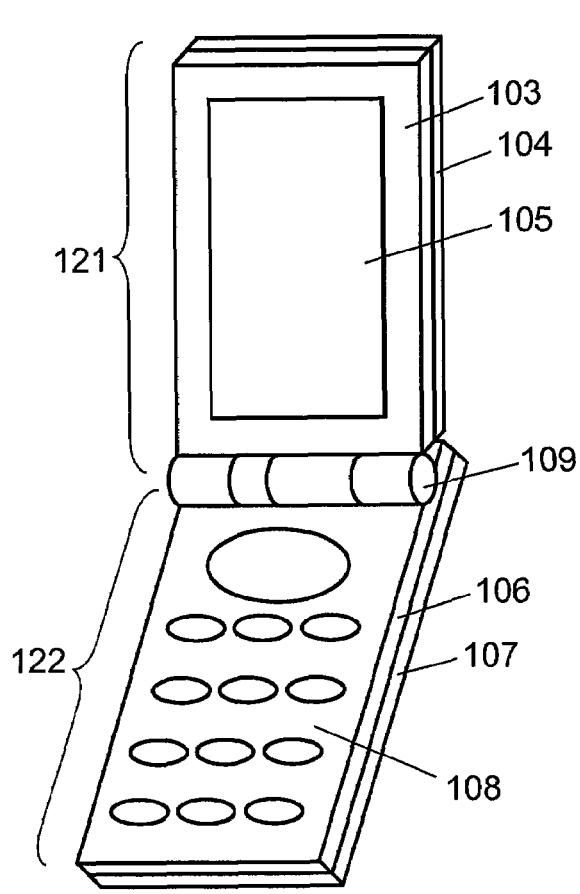
FIG. 7A is a perspective view of the portable wireless apparatus of the prior art.
Figure 7B:
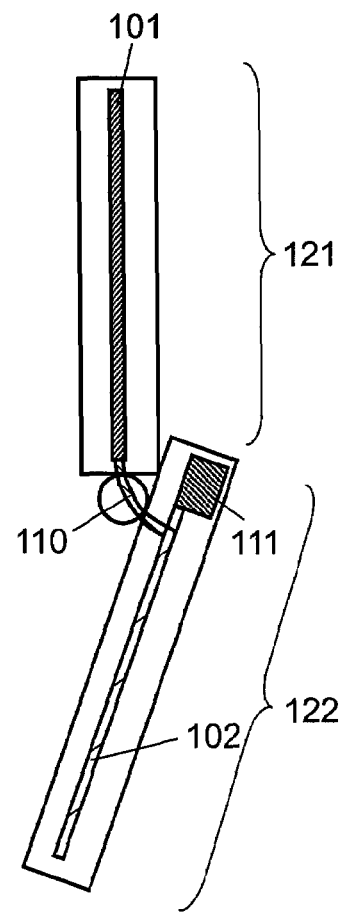
FIG. 7B is a sectional view of the portable wireless apparatus of the prior art.

FIG. 5A is a perspective view showing a portable wireless apparatus according to Embodiment 3 of the invention, and FIG. 5B is a sectional view of the portable wireless apparatus according to Embodiment 3 of the invention. Here, the description on the components having configurations similar to those of Embodiment 1 is omitted by designating them by the common reference numerals.

In FIG. 5A and FIG. 5B: front case 3 of first casing 21 is equipped with first parasitic element 12; back case 4 of first casing 21 with second parasitic element 13; front case 6 of second casing 22 with third parasitic element 14; and back case 7 of second casing 22 with fourth parasitic element 15. First parasitic element 12 and third parasitic element 14 are connected with each other through first connector 16. Moreover, second parasitic element 13 and fourth parasitic element 15 are connected with each other through second connector 17. First connector 16 and second connector 17 are formed of a flexible conductor.

This configuration makes it possible to connect the conductor element on the side of first casing 21 and the conductor element on the side of second casing 22 through the flexible connector. As a result, the element lengths of the parasitic elements can be enlarged while configuring the openable portable wireless apparatus so that the portable wireless apparatus can match the low frequency needing the large element length.

Here, first parasitic element 12 to fourth parasitic element 15, and first connector 16 and second connector 17 are individually set to have such lengths as can act as the reflector or the director, as has been described in connection with Embodiment 1.

In FIG. 5A and FIG. 5B, on the other hand, first parasitic element 12 to fourth parasitic element 15 are formed straight. However, first parasitic element 12 to fourth parasitic element 15 may also be formed generally into a shape of letter substantially "U" along the shapes of first casing 21 and second casing 22.

Embodiment 4

The invention will be described on Embodiment 4 with reference to the accompanying drawings. Here, the description on the components having configurations similar to those of Embodiment 1 is omitted by designating them by the common reference numerals.

FIG. 6A is a perspective view showing a portable wireless apparatus according to Embodiment 4 of the invention, and FIG. 6B is a sectional view of the portable wireless apparatus according to Embodiment 4.

In FIG. 6A and FIG. 6B: front case 3 of first casing 21 is equipped with first parasitic element 12 matching a first predetermined frequency band; back case 4 of first casing 21 with second parasitic element 13 matching the first predetermined frequency band; front case 6 of second casing 22 with third parasitic element 14 matching a second predetermined frequency band; and back case 7 of second casing 22 with fourth parasitic element 15 matching the second predetermined frequency band.

Here, first parasitic element 12 to fourth parasitic element 15 are set to such individual lengths as can act as the reflector or the director, as has been described in connection with Embodiment 1.

This configuration makes it possible to reduce the performance degradation in the speeches near the human body for a plurality of frequency bands, i.e., the first frequency band and the second frequency band.

Although the description thus far made has been directed to the case of the two frequency bands, the invention can also apply that configuration, too, to three or more frequency bands.

In FIG. 6A and FIG. 6B, on the other hand, first parasitic element 12 to fourth parasitic element 15 are formed straight, but may also be formed generally into a shape of letter substantially "U" along the shapes of first casing 21 and second casing 22. In FIG. 6A and FIG. 6B, moreover, third parasitic element 14 and fourth parasitic element 15 are configured on the side of second casing 22, but may be disposed on the side of first casing 21. Then, it is possible to further reduce the gripping influences.

In FIGS. 6A and 6B, moreover, first parasitic element 12, second parasitic element 13, third parasitic element 14 and fifth parasitic element 15 are disposed longitudinally of FIG. 6A. In the invention, it is needless to say that first parasitic element 12, second parasitic element 13, third parasitic element 14 and fourth parasitic element 15 may also be disposed transversely of FIG. 6A.

As has been described in connection with the embodiments thus far described, the portable wireless apparatus of the invention are made at least such that the first parasitic element longer than the electrical length of the antenna is configured in the front case, and such that the second parasitic element shorter than the electrical length of the antenna is configured in the back case. By controlling the radiation directivity with those first parasitic element and second parasitic element, the directivity can be given in the opposite direction backward of the human body in the speeches thereby to provide the portable wireless apparatus, which can reduce the characteristic degradation in the speeches.

INDUSTRIAL APPLICABILITY

The invention can provide a portable wireless apparatus capable of reducing the characteristic degradation in the speeches close to the human body so that it is used near the human body.

The invention claimed is:

1. A portable wireless apparatus comprising:
   a first casing including a front case on the side having a main display, a back case on the opposite side of the front case, and a first circuit board;
   a second casing including a front case on the side having an input unit, a back case on the opposite side of the front case, and a second circuit board;
   a circuit board connector for electrically connecting the first circuit board and the second circuit board;
   a hinge having the circuit board connector for connecting the first casing and the second casing in a foldable manner;
   an antenna connected to the hinge side of the second circuit board;
   a first parasitic element configured in the first casing and made longer than the electrical length of the antenna;
   a first shorting portion connected between the first circuit board and the first parasitic element for reducing a length of the first parasitic element; and
   a second parasitic element configured in the first casing and made shorter than the electrical length of the antenna,
   wherein the first parasitic element and the second parasitic element are disposed in order from the front case to the first casing to the back case of the first casing.

2. The portable wireless apparatus of claim 1,
   wherein the electric length of the first parasitic element is larger than one half wavelength of a predetermined frequency band; and
   wherein the electric length of the second parasitic element is smaller than one half wavelength of a predetermined frequency band.

3. The portable wireless apparatus of claim 1,
   wherein the first parasitic element and the second parasitic element are disposed at the positions of the first casing, in which they are opposed to each other.

4. The portable wireless apparatus of claim 1,
   wherein the first parasitic element is configured by plating the first casing; and
   wherein the second parasitic element is configured by plating the first casing.

5. The portable wireless apparatus of claim 1,
   wherein the first parasitic element is configured by fixing a metal sheet on the case of the first casing; and
   wherein the second parasitic element is configured by fixing a metal sheet on the case of the first casing.

6. The portable wireless apparatus of claim 1,
   wherein at least either the first parasitic element or the second parasitic element is formed generally into a shape of letter substantially "U" according to the shape of the first casing.

7. The portable wireless apparatus of claim 1, further comprising:
   a third parasitic element disposed in the front case of the second casing;
   a fourth parasitic element disposed in the back case of the second casing;
   a first connector for electrically connecting the first parasitic element and the third parasitic element; and
   a second connector for electrically connecting the second parasitic element and the fourth parasitic element,
   wherein the first connector and the second connector are individually threaded in the hinge.

8. The portable wireless apparatus of claim 7,
   wherein the first parasitic element and the second parasitic element match a first predetermined frequency band; and
   wherein the third parasitic element and the fourth parasitic element match a second predetermined frequency band.

* * * * *